Sept. 25, 1934.  F. HAMILTON  1,974,612

OPHTHALMIC INSTRUMENT

Filed July 12, 1933

FREDERICK HAMILTON
INVENTOR

BY *G. A. Ellestad*

ATTORNEY

Patented Sept. 25, 1934

1,974,612

UNITED STATES PATENT OFFICE 1,974,612

OPHTHALMIC INSTRUMENT

Frederick Hamilton, Harmony, R. I., assignor to Bausch & Lomb Optical Company, Rochester, N. Y., a corporation of New York Application July 12, 1933, Serial No. 680,069

5 Claims. (Cl. 88—20)

This invention relates to ophthalmic instruments and more particularly it has reference to a device which is used by refractionists for determining the amount and axis of astigmatism.

One of the objects of my invention is to provide an improved device for determining the axis and amount of astigmatism. Another object is to provide an improved device of the type described having test objects which can be projected onto a screen. A further object is to provide a device of the type described having two test objects and cooperating index members and means for simultaneously moving one of said test objects and one of said index members. These and other objects and advantages reside in certain novel features of construction, arrangement and combination of parts as will hereinafter be more fully described.

Referring to the drawing.

Figure 1:
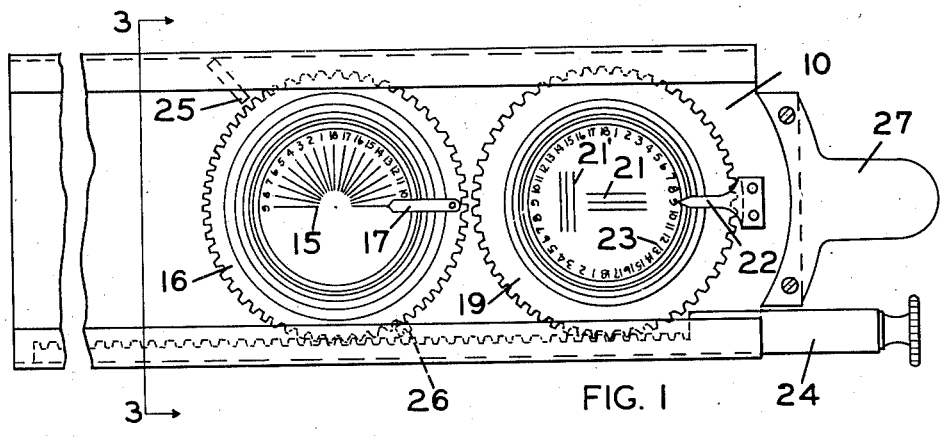
Fig. 1 is a front view of the device embodying my invention.
Figure 2:
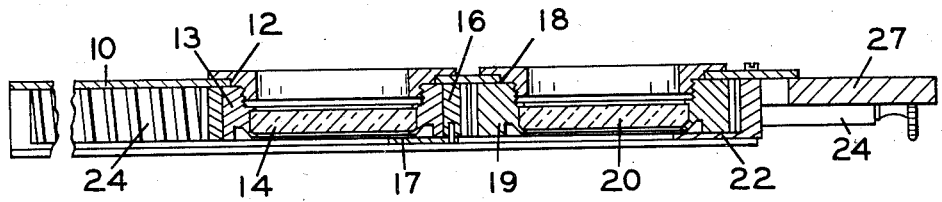
Fig. 2 is a horizontal sectional view.
Figure 3:
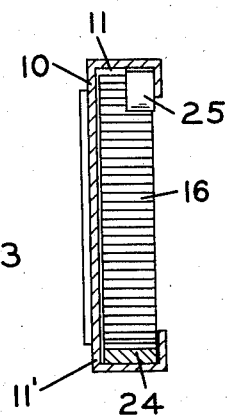
Fig. 3 is a sectional view taken on line 3—3 of Fig. 1.

A preferred embodiment of my invention is illustrated in the drawing wherein 10 indicates a frame which may be made of metal or any other suitable opaque material. At its top and bottom edges the frame is formed to provide the channels 11 and 11'. The frame 10 is provided with an opening 12 opposite which is fixedly mounted a cell 13 carrying a glass plate 14 provided with the test indicia comprising a series of radially disposed lines 15. Rotatably mounted around the outside of cell 13 is the annular ring gear 16 which carries an index pointer 17.

The frame 10 is also provided with another opening 18 within which is rotatably mounted an annular ring gear 19 which carries the glass plate 20 provided with test indicia comprising two sets of parallel lines 21 and 21' with one set perpendicular to the other set. An index pointer 22 fixedly secured to frame 10 cooperates with the numbers 23 which are arranged around the periphery of plate 20.

Slidably mounted within the lower channel 11' is a rack 24 whose teeth engage the teeth of the two ring gears 16 and 19 so that the two gears are simultaneously rotated by equal amounts in the same direction when the rack 24 is moved one way or the other. A pin 25 fixed to frame 10 cooperates with a screw 26 carried by ring gear 16 to limit the motion of the rack and gears. The frame 10 is provided with a handle 27 to facilitate manipulation of the slide.

In use, my device, which really constitutes a type of projection slide, is placed in position in a projection apparatus such, for example, as that disclosed in United States Letters Patent No. 1,174,547 issued to M. B. Clason on March 7, 1916. The radial lines 15 are thus projected onto the screen along with an outline of the index 17. Certain of the radial lines 15 will appear clearer and sharper than the others and the patient tells the refractionist which lines are the clearest. The refractionist moves the rack 24 until pointer 17 is opposite the lines which appear the clearest to the patient. This gives the refractionist the approximate location of the cylinder axis. The slide is then moved so that only the characters on plate 20 are projected onto the screen. Since the pointer 17 and the plate 20 move together the test character 21 will be located in the same angular position as occupied by pointer 17. The rack 24 is then moved back and forth a small amount until the lines 21 appear to be the clearest to the patient and from the scale 23 the refractionist determines the exact location of the axis of astigmatism. The refractionist then places the proper cylindrical lenses before the eye until both sets of lines 21 and 21' appear about equally clear and sharp and thereby determines the amount of correction necessary.

From the foregoing, it will be apparent that I am able to attain the objects of my invention and provide an improved device whereby the refractionist may determine the axis and amount of cylinder correction needed in cases of astigmia. Various modifications can obviously be made without departing from the spirit of my invention.

I claim:

1. A device for refracting eyes comprising a frame, a test object fixedly carried by said frame, a movably mounted index associated with said object, a second test object movably mounted on said frame, a fixed index cooperating with said second object and means for simultaneously moving said movably mounted index and said second object by equal amounts in the same direction.

2. A device of the character described comprising a frame, a test object fixedly mounted on said frame, an index movably mounted on said frame to cooperate with said object, a second test object movably mounted on said frame, an index fixedly mounted on said frame to cooperate with said second test object and means on said frame for simultaneously moving said first named index and the second test object by equal amounts in the same direction, said means comprising a slidably mounted rack which cooperates with gear wheels connected to the movable index and test object.

3. A device of the character described comprising a frame, a pair of transparent test objects mounted on said frame, one of said objects being movably mounted and the other being fixedly mounted, a movably mounted index pointer cooperating with said fixedly mounted test object, a fixed index pointer cooperating with the movable object and means for simultaneously moving the movable index pointer and object by equal amounts in the same direction.

4. A device of the character described comprising a frame having an opening, a transparent plate fixedly mounted in said opening, said plates carrying test indicia, a ring gear rotatably mounted on said frame concentric with said plate, an index pointer fixedly mounted on said gear, said frame having a second opening, a second ring gear rotatably mounted on said frame concentric with said opening, a transparent plate mounted on said second ring gear, said plate carrying test indicia, a pointer fixedly mounted on said frame adjacent to said second transparent plate and a rack slidably mounted on said frame, said rack being in engagement with both of said ring gears.

5. A device of the character described comprising a frame, a transparent plate fixedly mounted on said frame, said plate bearing indicia comprising radial lines, a pointer on said frame mounted to move around said radial lines, a second transparent plate rotatably mounted on said frame, said second plate bearing a scale and indicia for determining the resolving power of the eye in two meridians at right angles to each other, a second pointer fixedly mounted on said frame in position to cooperate with said scale and means for simultaneously moving said first named pointer and said second plate in the same direction and in equal amounts.

FREDERICK HAMILTON.